No. 816,357. PATENTED MAR. 27, 1906.
J. H. McDONALD.
APPARATUS FOR PURIFYING WATER.
APPLICATION FILED MAR. 4, 1902. RENEWED AUG. 18, 1905.
3 SHEETS—SHEET 1.
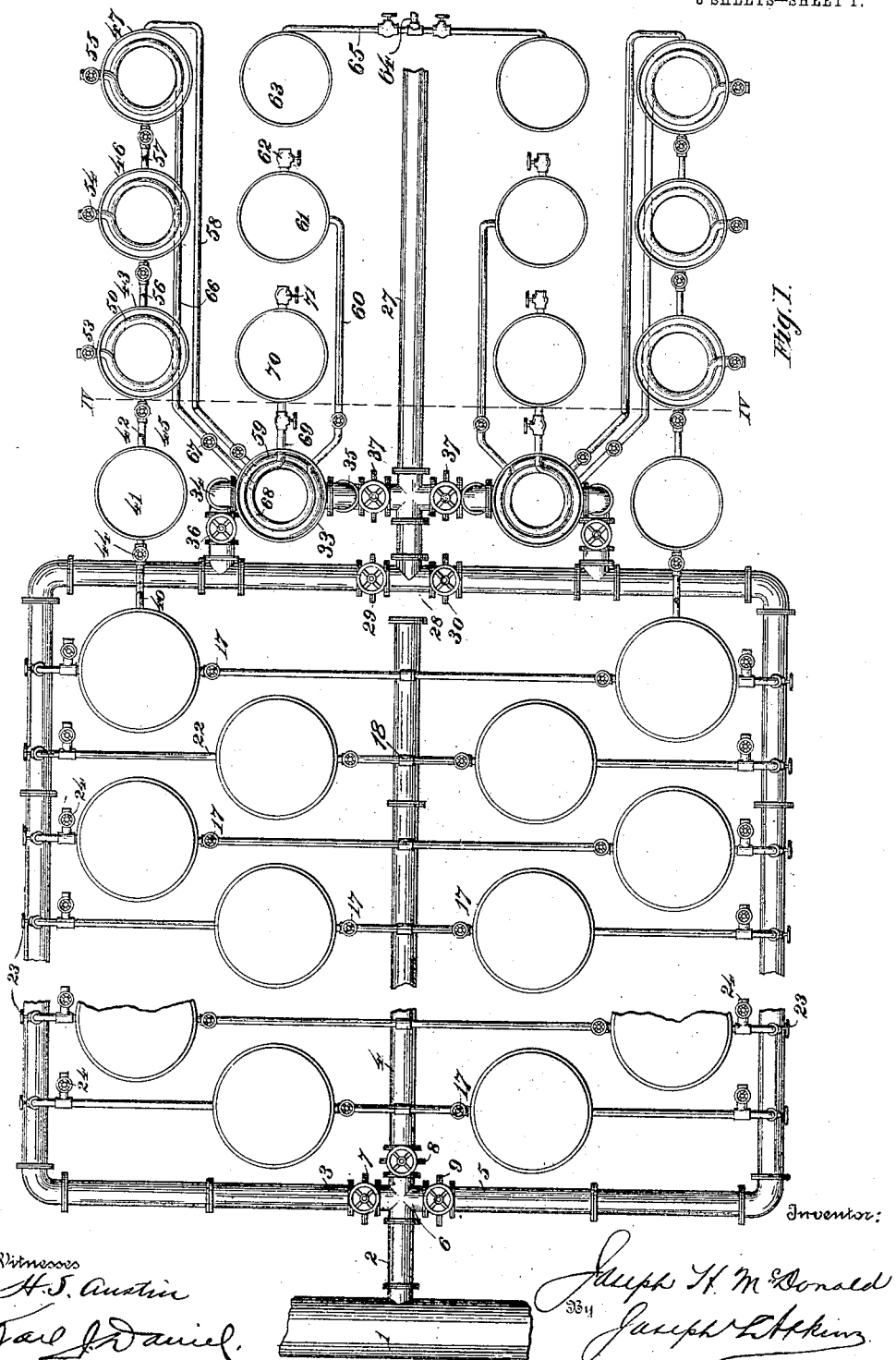

No. 816,357. PATENTED MAR. 27, 1906.
J. H. McDONALD.
APPARATUS FOR PURIFYING WATER.
APPLICATION FILED MAR. 4, 1902. RENEWED AUG. 18, 1905.
3 SHEETS—SHEET 2.
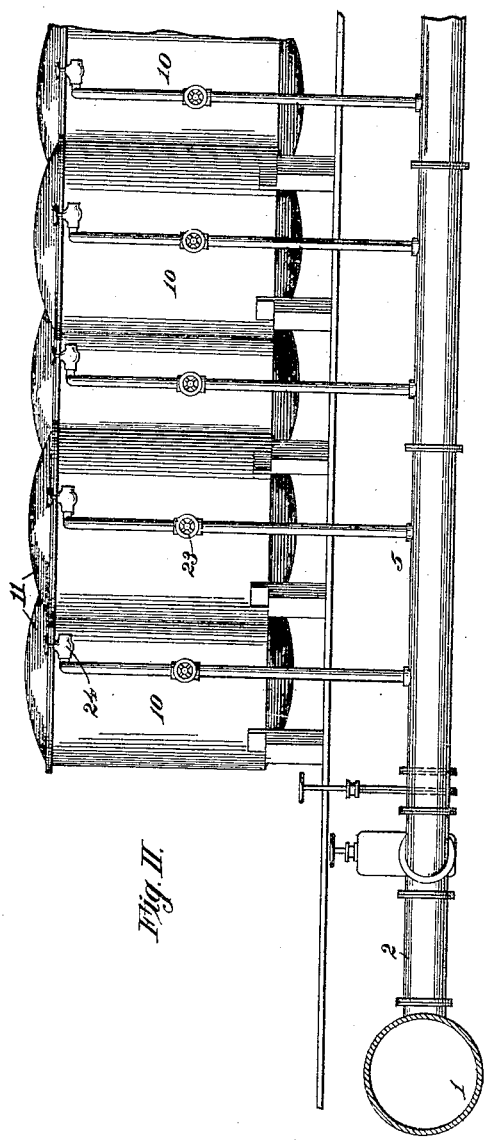
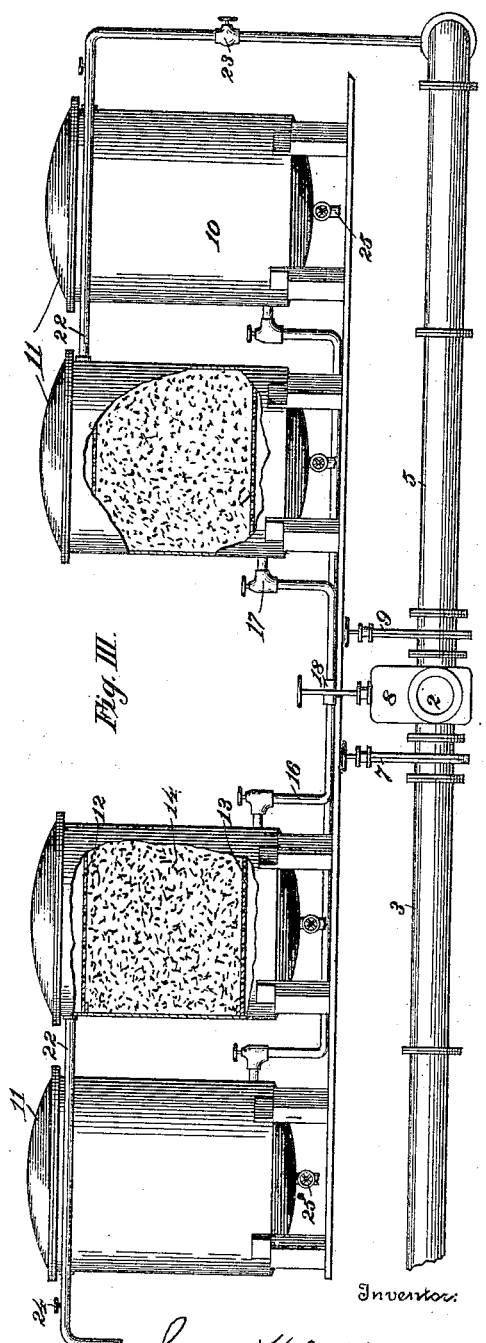
Witnesses
Inventor:
Joseph H. McDonald
By Joseph T. Atkins,
Attorney

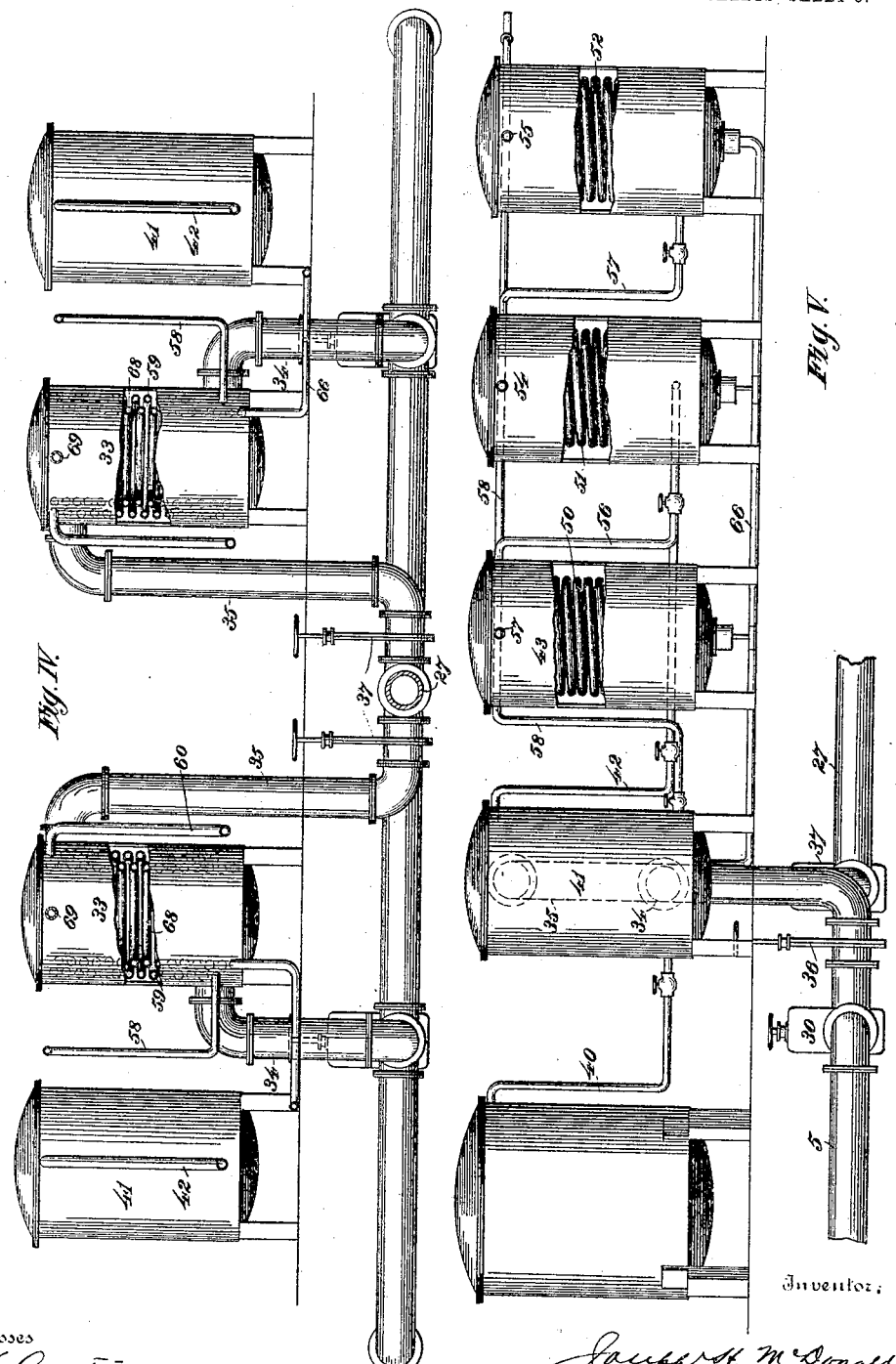

UNITED STATES PATENT OFFICE.

JOSEPH H. McDONALD, OF NEW YORK, N. Y.

APPARATUS FOR PURIFYING WATER.

No. 816,357.　　　　Specification of Letters Patent.　　　Patented March 27, 1906.

Original application filed December 21, 1900, Serial No. 40,683. Divided and this application filed March 4, 1902. Renewed August 18, 1905. Serial No. 274,806.

*To all whom it may concern:*

Be it known that I, JOSEPH H. McDONALD, of New York, in the county of New York, State of New York, have invented certain new and useful Improvements in Apparatus for Purifying Water, of which the following is a complete specification, reference being had to the accompanying drawings.

The object of my invention is to produce apparatus for thoroughly purifying the water-supply of a city, and comprehends means whereby the state of purification up to the last stage of purity obtainable by distillation may be regulated to suit the requirements of use.

It is recognized by scientists to be a fact that the presence of microscopic life in water constitutes the source of greatest menace to health in drinking-water. Filters in general use, especially such as are adapted to afford considerable delivery of purified water, while adapted at their best to reduce water to a practically pure state from a sanitary standpoint, become nevertheless after a short period of operation fouled. Heretofore washing or aeration, or both, have been the means resorted to for cleaning such filters; but it is found in practice that such means fail to restore the filters to their initial efficiency and that through continued use their percentage of efficiency gradually declines.

This condition is due to the fact, well recognized in the art, that filtering media become by use inevitably charged with an offensive slime, which becomes sponge-like and sufficiently porous for the passage through it of the water, but which robs the media of their efficiency as agencies of filtration. Moreover, the presence thereof constitutes in itself an additional source of contamination to water passing through it. This mass of slime and other offensive matter cannot be washed out of the filtering material by water or air, because, being permeable to water in the process of filtration, the washing water or air employed finds likewise ready passage through it. For that reason I employ in my system of water purification means for subjecting the filtering material to such a degree of heat as will coagulate and disintegrate the slime and other deleterious material in the filtering media, after which it may be readily cleaned by washing. Consequently by that means I am enabled at regular intervals of any required duration to restore the filtering media of my system absolutely to its initial efficiency, and thereby to obtain a constant supply of practically pure water.

My system includes not only means for sterilizing the filtering media employed, and thereby promoting therein a constant efficiency of the filtering agent, but also means for sterilizing the water itself, thereby destroying the last germs of animal or vegetable life which may remain therein, or finally of distilling the water, and thereby securing in it the highest state of purity obtainable.

Not only does my system include means for the accomplishment of the several objects specified, but includes means for accomplishing those objects economically.

An important feature employed by me for the purposes of water sterilization consists in employing means for repressing ebullition of the water at or above the temperature of 212° Fahrenheit, to which temperature it is necessary to subject the water in order to sterilize it. Ordinarily boiled water has an unpalatable taste; but I have found that if boiling be prevented during the time of application of a sterilizing degree of heat and that if the water be thereafter cooled without violent motion that the product after sterilization will be pure and palatable. For that reason my system comprehends means of sterilization without ebullition.

In the accompanying drawings I illustrate one form of embodiment of my invention which will afford a means of explication of its principle.

In the drawings, Figure I is a top plan view of my system complete, portions being broken away in order to permit of illustration upon a scale sufficiently large to be readily legible. Fig. II is a side elevation of a portion of the filter battery. Fig. III is an end elevation of the filter battery shown in Fig. I. Fig. IV is a section on the line IV IV of Fig. I looking toward the left. Fig. V is a side elevation of the subject-matter of Fig. I not included in Fig. II, but showing one of the filters of the battery illustrated in Fig. II.

Referring to the numerals on the drawings, 1 indicates a main supply-pipe communicating with a source of water-supply—for example, a reservoir (not illustrated) adapted to afford a suitable head of water. 2 indicates a main leading therefrom and preferably communicating with branches 3, 4, and 5 through a four-way fitting 6, the head of each branch being controlled by a valve, (indicated by 7, 8, and 9, respectively.) The number of branches is non-essential except in so far as they shall afford independent means of water-supply through or around a battery or batteries of filters. By "battery" of filters I mean a plurality of individual filters which may be operated as a unit. In the accompanying drawings I illustrate what may be regarded as a single battery of filters or two batteries of filters located upon opposite sides of the branch pipe 4. They constitute a single battery, because collectively they may be operated as a unit, while at the same time they constitute two batteries, because one set of filters on one side of the branch 4 may be in operation while the other set is being cleaned. In this connection it may be also specified that any one of the filters comprehended in the battery or batteries may be shut out of service individually or in connection with any other or others without interruption of the operation of the remaining filters.

Inasmuch as each filter is essentially identical with every other one, it will be sufficient to describe one for all. Referring, therefore, to Fig. III, it is specified that each filter consists of a closed case 10, constructed so as to withstand any pressure that may be put upon them and having a cap 11 secured to the case, as by a crown of bolts or otherwise, which will facilitate the gaining of access to the interior of the case 10. Each case is divided by transverse or horizontal partitions 12 and 13, adapted to confine between them a mass of filtering material 14. This material may be of any preferred kind—such, for example, as granulated coke. I do not limit myself to the employment of any special filtering medium in preference to another.

Each case 10 is provided with an inlet-pipe 16, having a controlling-valve 17. For convenience of construction each pair of pipes 16 communicates with a T-fitting 18, through which communication is established as through a common supply-pipe 19 with the main branch 4. As illustrated, each pipe 16 is a supply-pipe and communicates, preferably, with the interior of its case 10, below the partition 13. With that arrangement a discharge-pipe 22 leads from the interior of the case 10, above its partition 12. Consequently water in passing from the supply-pipe 16 to its correlated discharge-pipe 22 must pass through the mass of filtering material 14. Each discharge-pipe 22 is provided with a controlling-valve 23, and each of the pipes 22 between the valve 23 and its case 10 is provided with a valve-controlled steam-pipe 24, communicating with a source of steam-supply. (Not illustrated.) Each case is also provided, preferably in its bottom, with a valve-controlled washout-pipe 25. It may be for convenience here specified that by closing the valves 17 and 23 of any of the cases 10 and by opening the pipes 24 and 25 the filtering material 14 of that case may be thoroughly sterilized by the heat of the steam from its pipe 24, after which the pipe 24 may be closed, and the valve 17 being opened the steam-treated impurities may be washed out from the mass of filtering material and discharged through the pipe 25. It is in this manner that the filtering material may be sterilized and restored to its initial efficiency whenever required, which has been stated to be one of the main objects of my invention.

The branch pipes 3 and 5 after passing around the battery or batteries of filters with which they are respectively connected through their individual discharge-pipes 22 preferably meet in a general delivery-pipe 27, connection being preferably made therewith, as through a T-fitting 28, upon the opposite sides of which the pipes 3 and 5 are by preference provided, respectively, with valves 29 and 30.

The foregoing apparatus constitutes one complete form of embodiment of my invention, being adapted to afford through the delivery-pipe 27 a constant flow of water rendered as pure as filtration can make it. It will therefore be in order to specify at this point the operation of so much of the apparatus as is above described, with the exception of so much of the mode of operation as has been already explained. Proceeding accordingly, it may be stated that ordinarily when the apparatus is in operation as a whole the valves 7 and 9 are closed and the valves 8, 29, and 30 are kept open. The end of the pipe 4 being closed, water from the main 1 passing into the branch 4 is thence distributed through the various filters, each of which through its respective pipe 22 discharges into its respective branch pipe 3 or 5, whence it issues to the delivery-pipe 27 and is by it conducted to the different points of service along its line. I, however, provide the medial branch pipe 4 in order that the filters arranged upon opposite sides thereof may be constituted into independent batteries for alternate operation, whereby one battery may be cleaned while the other is in operation, and vice versa. It may be readily apprehended that this is entirely feasible, because the capacity of each battery may be increased without limit. In operating the system upon the plan last mentioned either of the lateral batteries, by which for convenience the filters upon opposite sides of the branch 4 may be designated, may be shut out of operation by closing either the valve 29 or the valve 30 and by closing all of the valves 17, when the battery is ready to be sterilized in the manner above specified. After the sterilizing treatment the washing of the filtering material in the several cases 10 may be accomplished either by the use of water admitted through the respective pipes 16 or by opening the valve 9 through the pipe 5. Indeed, by alternating the flow backward and forward through the filtering material after it is sterilized the most complete cleansing of each filter is made practicable. It is also obvious that after the sterilizing and washing operation a final purification or drying of the interior of the filters and their respective pipe connections may be made by blowing steam through them.

In addition to means for providing for the sterilizing and cleansing of the filters my system provides means for supplying to the delivery-pipe 27 a volume of water direct from the main 1. This would be an obvious advantage in case of the occurrence of a great conflagration along the line of the pipe 27, when the greatest possible supply of water regardless of its state of purity would be needed. For this purpose all that would be necessary to do would be to close the valve 8 and open the valves 7 and 9, the valves 29 and 30 being open.

My apparatus as above specified is adapted, as has been stated, to afford a supply of pure filtered water; but my system contemplates the incorporation with it also of means for sterilizing the filtered water or for obtaining a supply in quantity of distilled water, both being readily available wherever either is produced in connection with my system. The apparatus for producing sterilized and distilled water may be employed locally anywhere along the line 27; but it may be incorporated with and made a part of the filtering-station and is therefore illustrated and described in connection therewith. It may be stated that if installed along the line of the pipe 27 at a distance from the filtering-station the sterilizing and distilling apparatus may be in all respects substantially similar to that herein illustrated, with the exception that the steam employed for the purposes of sterilization and distillation would have to be derived from a local source of supply instead of from the same source as that from which the pipes 24 are supplied.

With the foregoing introductory explanation I proceed to explain that the whole or any portion of the water passing through the main pipe is caused to flow through a general cooler, (represented by the reference-numeral 33 in the drawings.) The cooler or cooling receptacle may be substantially correspondent in construction to the filter-case, as previously specified, being adapted like it to withstand pressure, but with its partitions 12 and 13, of course, omitted. As illustrated, it is provided with an inlet-pipe 34 and an outlet-pipe 35, communicating, respectively, with the branch pipe 3 or 5 and with the general delivery-pipe 27, the respective pipes 34 and 35 being provided with a gate or valve 36 and 37. It may be here noticed that the apparatus, as illustrated, upon opposite sides of the delivery-pipe 27 are duplicates one of the other and that a description of one will afford explanation of both. Proceeding upon that statement, it is specified that a supply of filtered water to be sterilized is drawn from the system at any convenient point therein in which the necessary supply is available. As illustrated, it is drawn from one of the individual filter-cases, as through a pipe 40, which communicates therewith in the same manner as its pipe 22 previously described. This pipe 40 may communicate with a special filter 41 and from it through a pipe 42 with the interior of a sterilizing-chamber 43. The pipes 40 and 42 are preferably provided with valves 44 and 45, respectively. The filter 41 may correspond with those previously described, and therefore requires no special description. In addition to the sterilizing-case 43 and in connection with it may be employed any number of similar sterilizing-cases—for example, those indicated at 46 and 47, respectively. Each of the cases 43, 46, and 47 is constituted into a sterilizer by the presence within it of a heating-coil 50, 51, and 52, respectively, which is respectively supplied with steam through an external valve-controlled pipe connection 53, 54, and 55, respectively. The several sterilizing-cases are operatively connected, as by valve-controlled pipes 56 and 57, and are collectively united, as by a valve-controlled pipe 58, to a coil 59 within the cooler 33.

Each of the sterilizing-cases being constructed like the filter-cases previously described are water-tight structures able to withstand internal pressure. Consequently when they are all completely filled with water it may be subjected to any degree of heat derivable from the steam-coil 50 51 52 without the possibility of any resultant ebullition. The valves with which the various pipe connections are, as specified, provided may afford means for retarding or interrupting the flow through the sterilizers to the coil 59 within the cooler; but it is designed in practice to employ a sufficient number of sterilizers in order to effect entire sterilization as it proceeds with even flow to the cooler-coil 59, where it is cooled and from which it proceeds through a valve-controlled pipe 60 to a decolorizer 61, from which it is discharged through a valve-controlled pipe 62 into a storage-reservoir 63, with which a general delivery-pipe 64 communicates, as through a valve-controlled branch 65. It should be observed with reference to the sterilizers and cooler that the volume of water subjected to sterilization is kept closely confined from the point at which it is first subjected to heat until it is cooled and that at no point in its course while heated is it suffered to expand into steam. Consequently all tendency to boil is repressed, and when delivered to the reservoir 63 it is in its original palatable state, but freed from the presence of all microscopic life.

Each of the coils 50, 51, and 52 are united by a pipe connection 66, which, as through the valve-controlled branch 67, communicates with the interior of a coil 68 within the cooler 63. Consequently the steam which supplies heat to the several sterilizers is there condensed and is conveyed, as through a valve-controlled pipe 69, to a distilled-water-storage reservoir 70, which is provided with a valve-controlled outlet-pipe 71, as illustrated.

It may be here specified, by way of further general explanation, that the decolorizer 61 may be of any of the various types familiar in the art; that the valves by which circulation is controlled through the sterilizing and distilling apparatus may be any preferred kind, automatic check-valves being employed, if desired, wherever they may be employed to advantage, and also that the flow of current through the sterilizers and coolers is maintained from one end to the other thereof in order that the best results sought for may be attained.

It is obvious from the foregoing that the operation of the sterilizing and distilling apparatus may be effected or interrupted as required by the opening or closing, respectively, of the valves 36, 37, and 44. It is immaterial, in fact, whether the valves 36 and 37 be opened or closed whether the cooler is in operation or not; but it is preferable to have them closed when the cooler is not in operation, and when they are opened the valve 29 or 30, as required, should preferably be closed.

In the foregoing specification I have referred to my system as one which embodies as a whole means for purifying a general water-supply; but while that view of the invention appears to be necessary in this case to fully set forth the relation of parts to the whole the claims appended hereto are restricted to features of the invention involving means of sterilization.

This application is divisional of application Serial No. 40,683, filed December 21, 1900, in which are embodied the remaining features of this invention.

What I claim is—

1. The combination with a water-supply pipe and filter in operative communication therewith, of a sterilizer-case in communication with the filtered-water supply, a steam-heating pipe within the same, coils communicating with the interior of the case and its heating-coil respectively, means of discharge from said coils respectively, and a cooler containing said coils and in operative communication with the source of water-supply.

2. The combination with a water-supply pipe operatively communicating with a cooler, of a pair of independent coils in said cooler, a sterilizer-case provided with a heating-coil communicating with one of the coils in the cooler, the interior of said case communicating with the other coil of the cooler.

3. The combination with a water-supply pipe operatively communicating with a cooler, of a pair of independent coils in said cooler, a sterilizer-case provided with a heating-coil communicating with one of the coils in the cooler, the interior of said case communicating with the other coil of the cooler, and independent receptacles communicating respectively with the coils in the cooler, one for the reception of water from one coil and the other for the reception of water from the other coil.

4. The combination with a water-supply pipe and a cooler, of a sterilizer-case and a coil within the cooler in operative communication with each other and with the water-supply pipe, a heating-coil within said case and a second coil within the cooler in operative communication with said heating-coil.

5. The combination with a water-supply pipe and a cooler, of a sterilizer-case and a coil within the cooler in operative communication with each other and with the water-supply pipe, a heating-coil within said case, and a second coil within the cooler in operative communication with said heating-coil, a pair of reservoirs and valve-controlled means of communication between said reservoirs and the coils within the cooler respectively.

In testimony of all which I have hereunto subscribed my name.

JOSEPH H. McDONALD.

Witnesses:
CHARLES STUART FOLSOM,
JOHN G. FOLSOM.